United States Patent [19]

Williams

[11] 4,448,360
[45] May 15, 1984

[54] CONTINUOUS OUTPUT VIBRATING DECK FOOD PROCESSOR

[75] Inventor: James E. Williams, Stamford, Conn.

[73] Assignee: Cuisinarts Research & Development, Inc., Greenwich, Conn.

[21] Appl. No.: 307,110

[22] Filed: Sep. 30, 1981

[51] Int. Cl.³ .................... B02C 18/06; B02C 18/08
[52] U.S. Cl. ............................ 241/92; 241/282.1; 366/184
[58] Field of Search ............... 366/42, 108, 184; 241/92, 199.12, 79, 278 R, 282.1, 282.2, 292.1

[56] References Cited

U.S. PATENT DOCUMENTS

| | | | |
|---|---|---|---|
| 3,684,253 | 8/1972 | Bevan | 366/108 X |
| 3,814,386 | 6/1974 | Guglietti | 366/108 |
| 4,092,737 | 5/1978 | Sandell | 366/31 X |
| 4,095,751 | 6/1978 | Artin | 241/92 X |

Primary Examiner—Mark Rosenbaum
Assistant Examiner—Timothy V. Eley
Attorney, Agent, or Firm—Parmelee, Bollinger & Bramblett

[57] ABSTRACT

A continuous output food processor has a bowl with a chute adapted to direct food processed by the food processor laterally out from the bowl. An inclined vibrating deck is mounted in the bowl below a food processing tool. This deck extends on a downward incline laterally out from the bowl through a chute. Food processed by the rotary tool becomes deposited on this vibrating deck and is guided and moved by the vibrating deck out from the bowl for discharge into a waiting container positioned under the outer end of the chute. The vibrating deck as well as the rotating food processing tool are driven by the electric motor drive of the food processor. The vibrating deck is driven by an eccentric coupled to such drive through a connecting rod coupled at its other end to a wrist pin mounted on the deck. The deck is provided with a plurality of pivot link mounts as spaced locations to facilitate the vibrating motion and stabilize the inclined orientation of this deck. A lip is provided to retain the food on the vibrating deck, and a retainer for the tray is utilized in order to allow removal and changing of the rotary tool without removing the deck. Advantageously, the vibrating deck feeds the output from the food processor into a separate container which may be very large, if desired; the bowl does not become filled; and the food processor is enabled to process a very large amount of food for serving many people at one meal without stopping.

28 Claims, 14 Drawing Figures

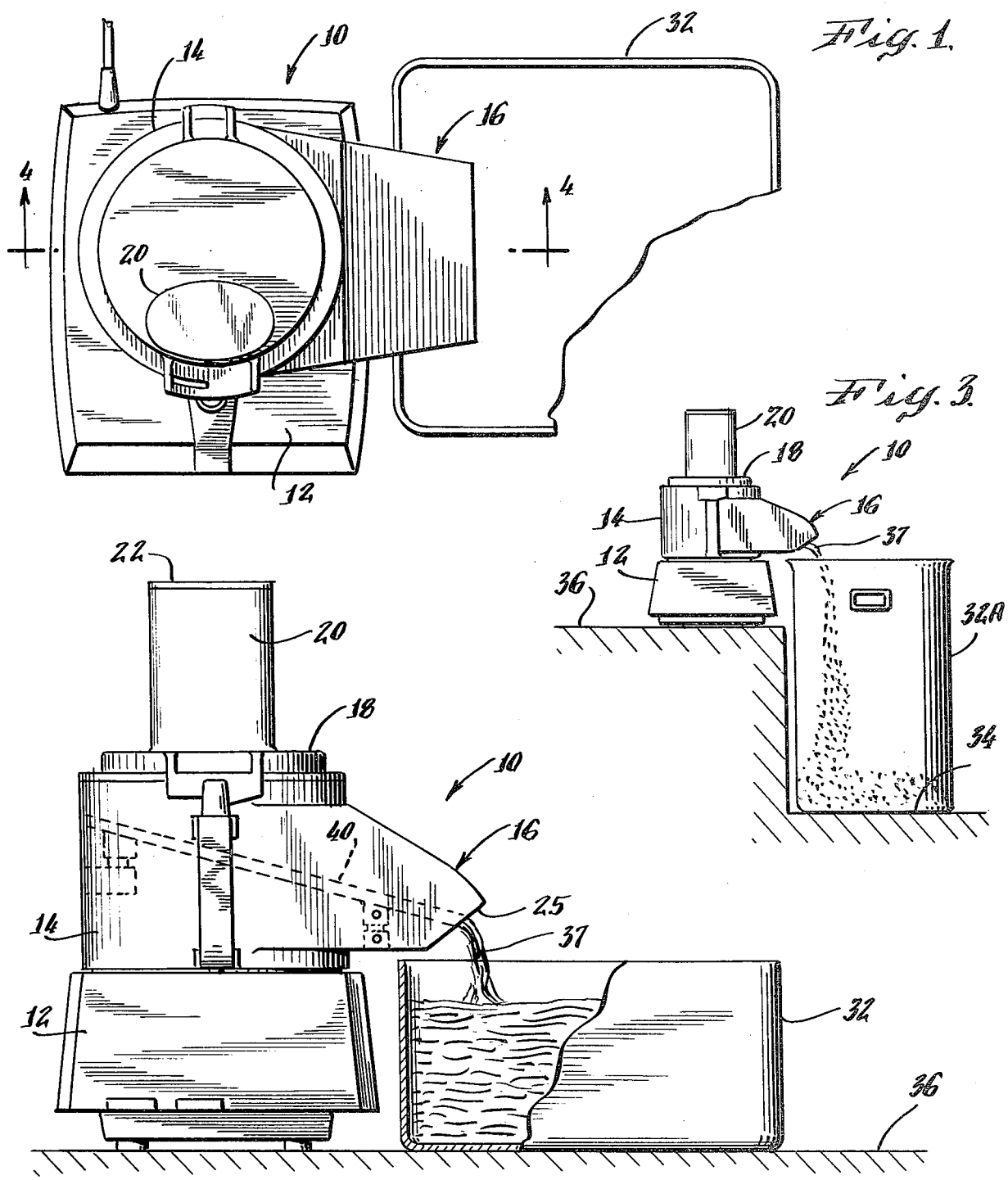

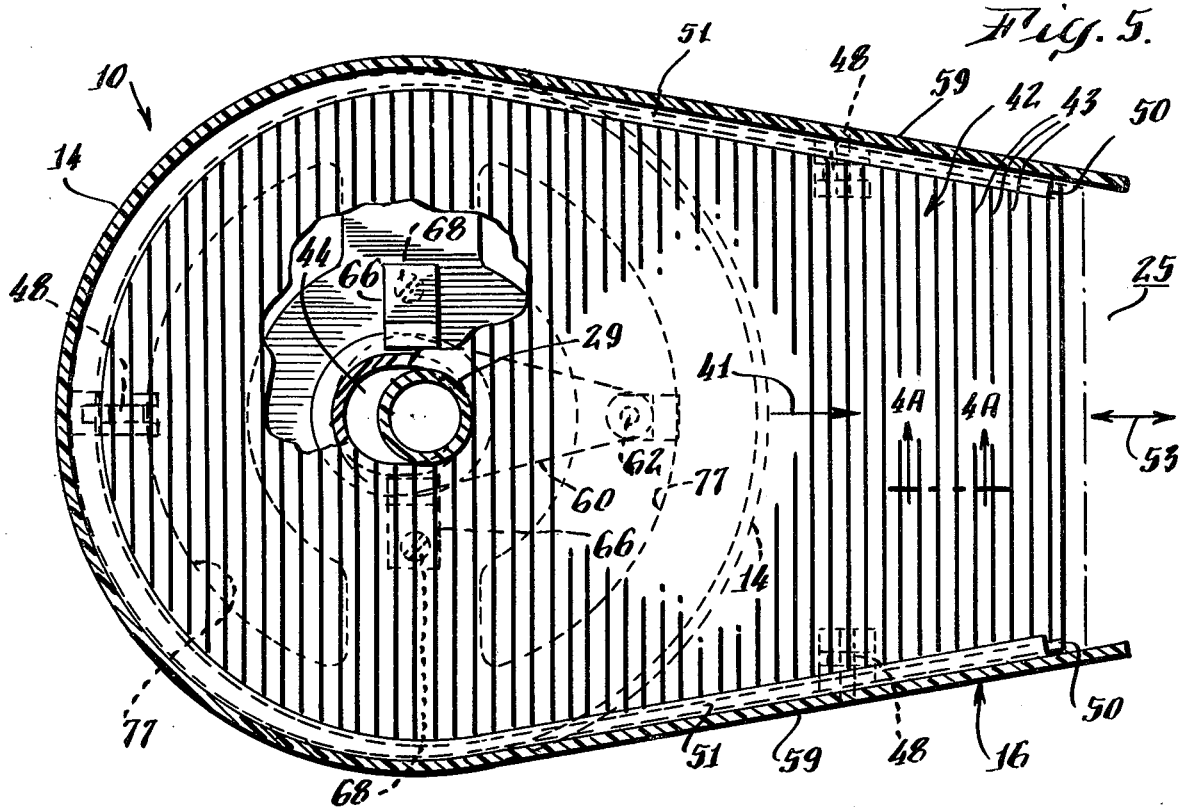
Fig. 5.
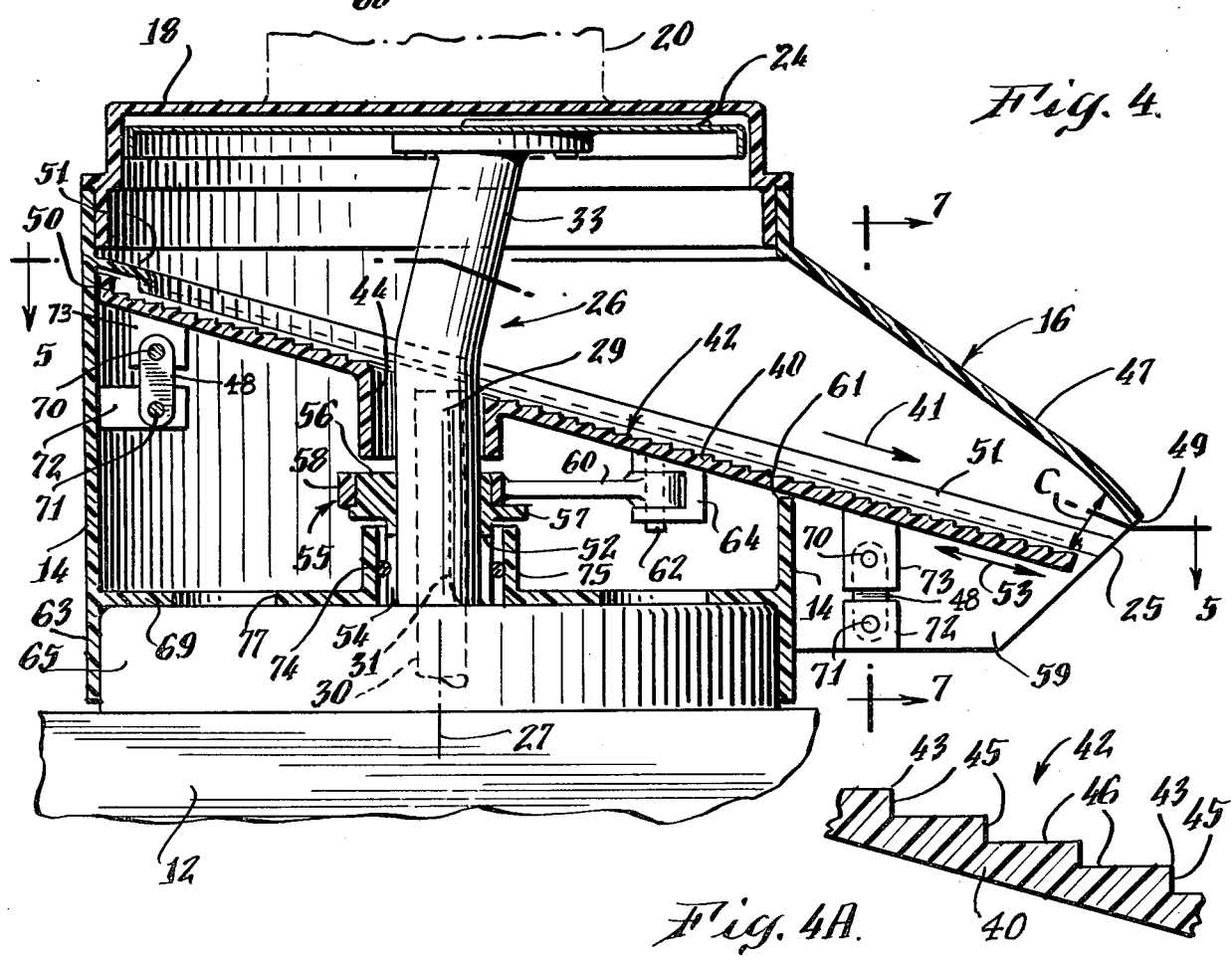
Fig. 4.
Fig. 4A.

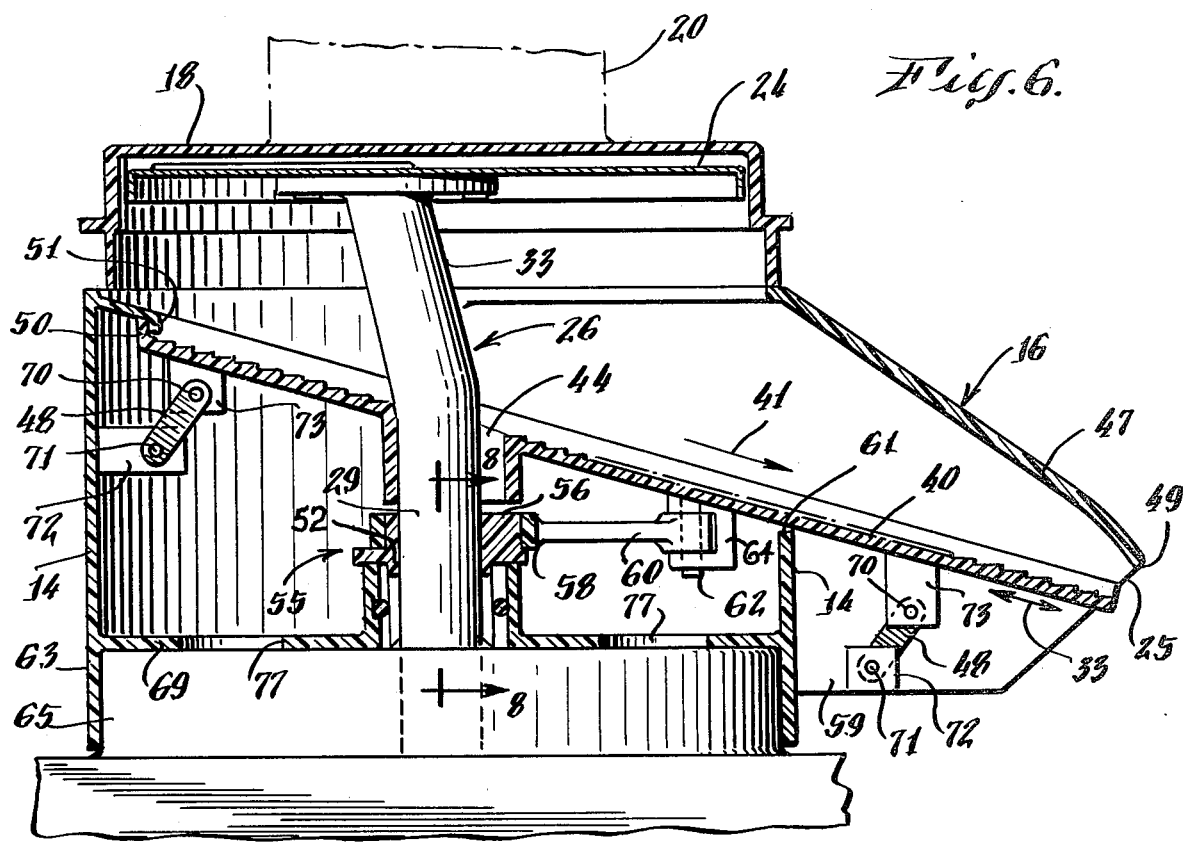
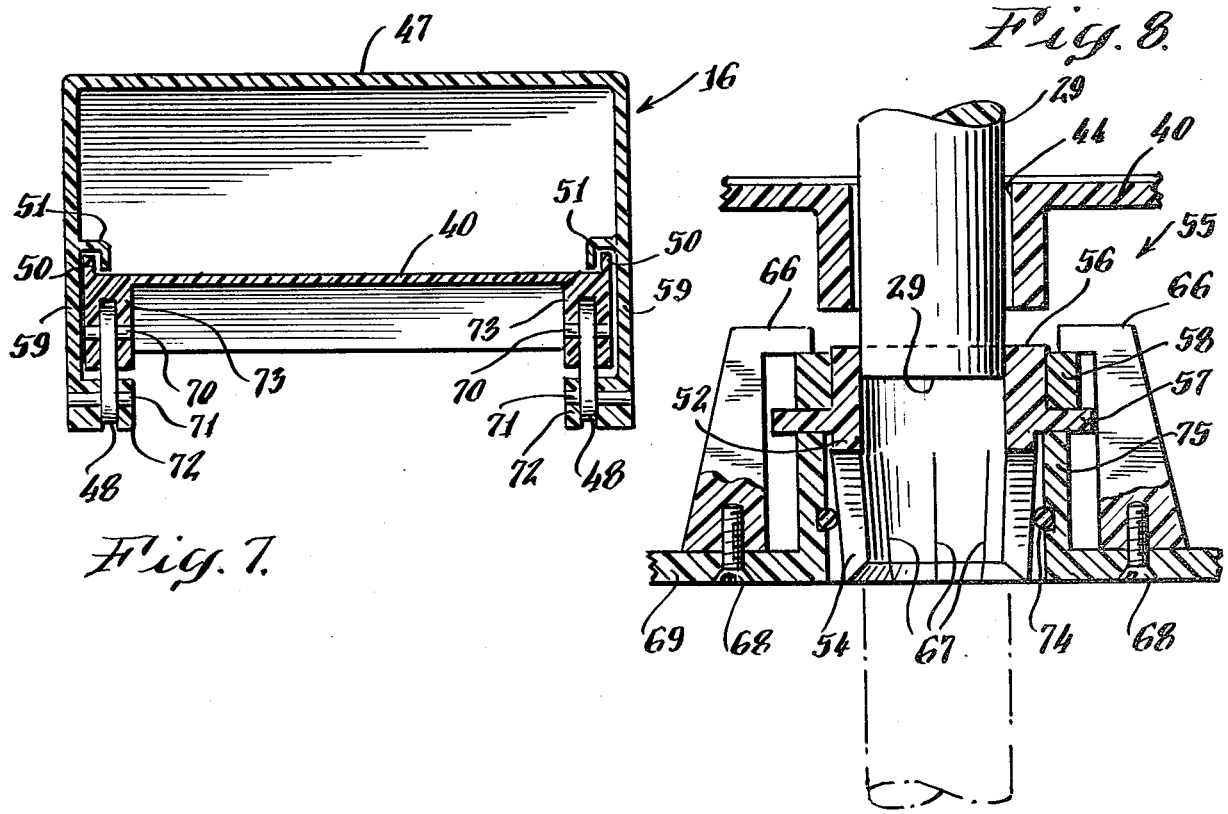

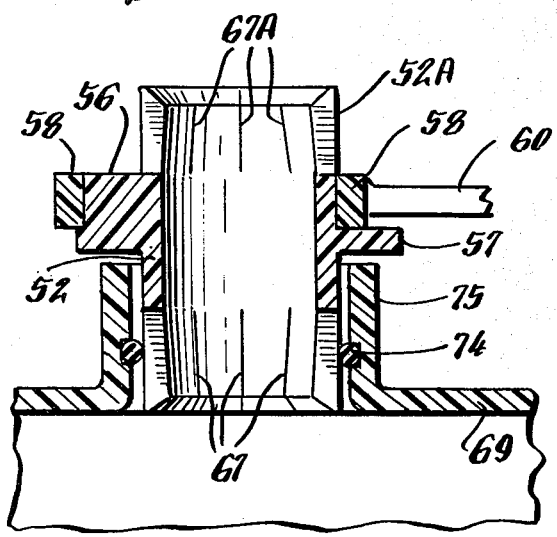
Fig. 9.
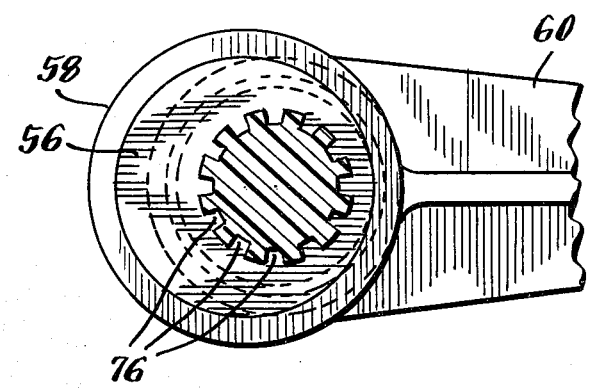
Fig. 11.
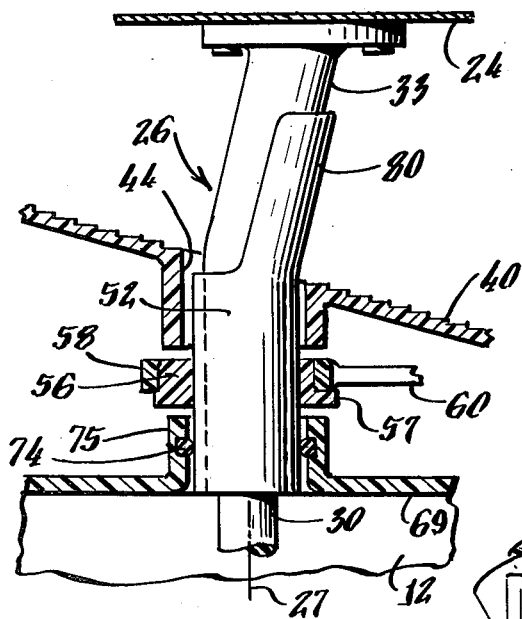
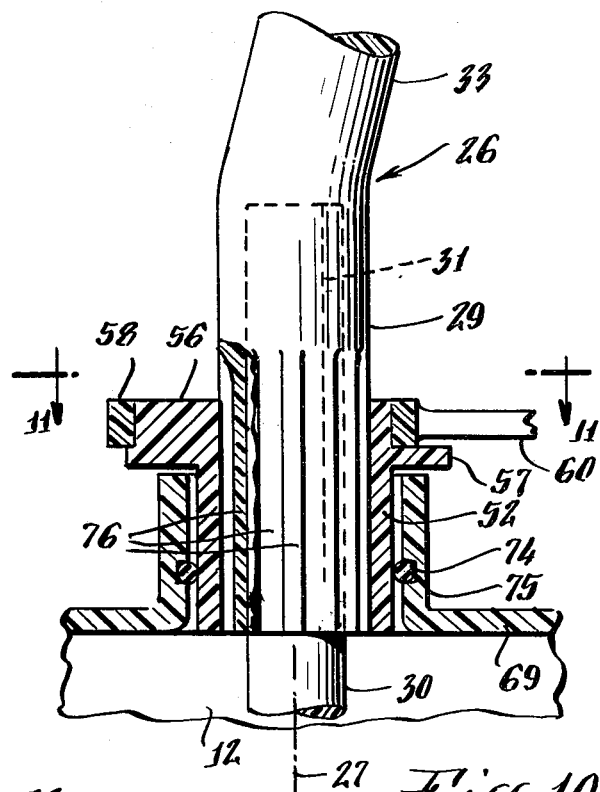
Fig. 10.
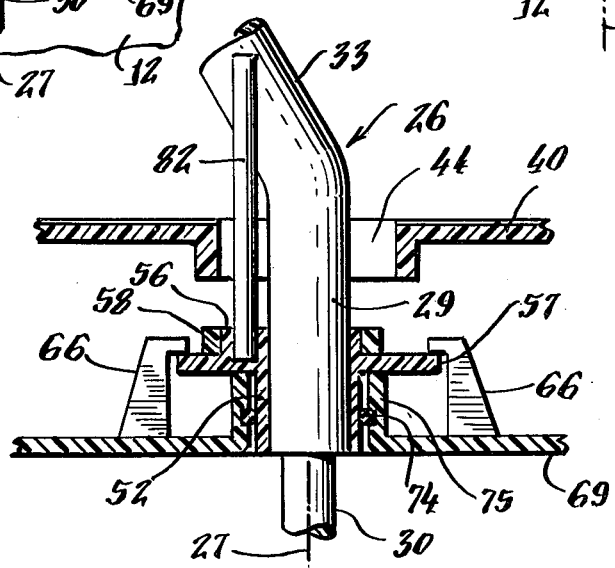
Fig. 12.
Fig. 13.

CONTINUOUS OUTPUT VIBRATING DECK FOOD PROCESSOR

BACKGROUND OF THE INVENTION

This invention relates to food processors, and more particularly to a food processor having vibrating deck apparatus mounted below the food processing tool on a downward incline through a chute leading laterally out from the bowl whereby processed food deposited on the deck is guided and moved by the deck for discharge into a separate container, which may be very large, thereby greatly increasing the food handling capabilities and capacity of the food processor.

The present invention is applicable to food processors of the type having a working bowl with motor-driven tool drive means extending into the bowl with which various selected rotary food processing tools can be engaged to be driven for performing various food processing operations in accordance with the desires of the user. A removable cover is secured over the top of the bowl during use. A feed tube having a feed passageway opens downwardly through the bowl, and food items to be processed are placed in the feed tube and then are pushed down through the feed tube into the bowl by means of a removable food pusher which is adapted to slide down in the manner of a plunger within the feed tube. The food items are sliced, grated, shred, cut into Julienne strips, or otherwise processed by the rotating tool in the top of the bowl and are deposited and retained in the bowl.

Additional information with respect to such food processors may be had by reference to U.S. Pat. Nos. 3,892,365—Verdun; 3,985,304—Sontheimer; 4,200,244—Sontheimer; 4,213,570—Jones; 4,216,917—Clare and Sontheimer; 4,226,373—Williams; 4,227,655—Williams; and 4,277,995—Sontheimer.

The food processor has proved very successful and has followed the mixer and the blender in providing machine aid in preparing food and not only does everything that the mixer and blender can do but far more including dicing, shredding, kneading, chopping, etc. in extremely short time intervals. One of the few limitations of the food processor is that of capacity, being limited by the size of the bowl. When the bowl is full, the tool must be removed and the bowl emptied, before processing further food. If, for example, it is desired to produce cole slaw for a large gathering of people, the repeated acts of removing the tool and emptying the bowl are time consuming and an annoyance to the user.

SUMMARY OF THE INVENTION

Accordingly, among the advantages of this invention are those resulting from the fact that it enables a food processor to provide a continuous or uninterrupted output of processed food into an exterior container located near to the machine so that the user does not need to empty the bowl of the machine itself.

Another advantage of this invention is that it conveniently provides continuous or uninterrupted food processing capabilities.

Still another advantage of this invention is that it provides new and improved food processor apparatus having an inclined vibrating deck included in a chute, such vibrating deck smoothly and neatly propelling the processed food items out from the food processor into an exterior container for enabling the preparation of large quantities of food without requiring tool removal for emptying the bowl, thereby saving time and avoiding the annoyance of repetitive bowl emptying.

It is an object of the present invention to provide a food processor in which the processed food is automatically conveyed laterally out from the food processor by means of an inclined vibrating deck which neatly and cleanly propels the processed food, without requiring manual scraping of the chute.

An additional object is to provide a vibrating deck advantageously driven by the same drive which serves to rotate the tool.

In carrying out this invention in one illustrative embodiment thereof, a food processor including a base housing having an electric motor drive, a bowl mountable on the housing for enclosing a rotary food processing tool within the bowl, said tool being rotatable within the bowl by the drive, with a removable cover adapted to be secured in position on the bowl and a feed tube forming a passageway for feeding food items into the bowl is provided having the improvement comprising a chute associated with the bowl adapted to convey food processed by the rotary tool laterally out from the bowl, with a vibrating inclined deck mounted in the bowl below the rotating tool which extends on a downward incline through the chute, whereby food processed by the rotary tool is deposited on the deck and is guided and moved by the vibrating deck through the chute for discharge into an exterior container, with the food items being propelled cleanly and neatly by the vibrating deck.

In the illustrative embodiment of this invention the power for moving the vibrating deck is advantageously derived from the same drive means which serves to rotate the food processing tool.

BRIEF DESCRIPTION OF THE DRAWINGS

The invention, together with further objects, features, aspects and advantages thereof will be more fully understood from a consideration of the following description taken in conjunction with the accompanying drawings, in which:

FIG. 1 is a top view of food processor apparatus embodying the present invention for feeding processed food items into an exterior container.

FIG. 2 is a side elevational view of the food processor shown in FIG. 1 with the exterior container being shown broken away to illustrate the processed food being deposited therein.

FIG. 3 is a side elevational view similar to FIG. 2, but drawn smaller in size, illustrating the use of a much larger exterior container.

FIG. 4 is an enlarged elevational sectional view taken along line 4—4 in FIG. 1.

FIG. 4A is a further enlarged elevational section of a portion of the vibrating deck, this section being taken along the line 4A—4A in FIG. 5.

FIG. 5 is a plan sectional view taken along lines 5—5 in FIG. 4 looking downwardly.

FIG. 6 is an elevational sectional view identical to FIG. 4, except illustrating the vibrating deck in an opposite operating position from that shown in FIG. 4.

FIG. 7 is a cross-sectional view of the chute and vibrating deck taken along line 7—7 in FIG. 4 looking toward the discharge end of the chute.

FIG. 8 is an enlarged elevational sectional view taken along line 8—8 in FIG. 6 illustrating a friction drive coupling and a hold-down mechanism for the vibrating drive means.

FIG. 9 illustrates another embodiment of a friction sleeve drive coupling for the vibrating drive means.

FIG. 10 is an elevational sectional view illustrating the use of a spline on the shank of a rotary tool along with a mating sleeve coupling which is splined for driving the vibrating drive means.

FIG. 11 is a plan cross-sectional view taken along line 11—11 in FIG. 10, looking downwardly.

FIG. 12 illustrates another embodiment of a drive coupling utilizing a saddle engaging on the offset sloping shank of a rotary tool for driving the vibratory drive means for vibrating the deck.

FIG. 13 shows another embodiment of a drive coupling utilizing a slaved post which is driven by the offset sloping dog-leg shank of the rotary food processing tool.

DESCRIPTION OF THE PREFERRED EMBODIMENTS

Referring now to FIGS. 1, 2, 4 and 5 a food processor, referred to generally with the reference number 10, is illustrated having a base housing 12 with a working bowl 14 mounted thereon having a chute 16 projecting laterally therefrom. The top of the bowl 14 is closed by a cover 18 which is arranged to be engaged and fastened in secure relationship in its normal operating position on the bowl 14 whenever the food processor 10 is in operation. Standing upwardly from the cover 18 is a food receiving hopper or feed tube 20 which opens downwardly through the cover 18. This feed tube 20 is designed to receive a food pusher 22 which is manually insertable in the manner of a plunger and is employed to push food items down through the feed tube 20 into engagement with a rotary tool 24 (see FIG. 4) mounted on a tool mounting means 30 for rotation in the bowl 14 for processing the food.

As is more fully shown and described in the patents to which reference is made above, the base housing 12 contains a relatively powerful electrical motor for driving the tool drive mounting means 30, which extends upwardly from the base housing 12 into the working bowl 14. A variety of different types of food processing tools 24 are provided having a shank 26 which may be selectively mounted on and engaged with the tool drive mounting means 30 in a positive drive relationship therewith for rotation of the tool 24 within the bowl.

As shown in FIG. 4 the tool drive mounting means 30 rotates about an axis 27, and the shank 26 of the rotary cutting tool 24 has a vertical lower portion 29 which is engaged on the drive means 30 for rotation concentrically about the axis 27. As illustrated in these drawings, the tool shank 26 is shown as a dog-leg shank having an upper portion 33 which is offset from the axis of rotation 27 as described and claimed in Williams U.S. Pat. No. 4,227,655, but it is to be understood that a tool with a straight shank 26 may be employed with the present invention.

Certain embodiments of the drive coupling means as shown in FIGS. 12 and 13 advantageously utilize the offset upper tool shank portion 33 for providing a driving engagement with the coupling. The other embodiments of the drive coupling means are associated with the concentric vertical lower portion 29 of the tool shank. Therefore, as indicated above, a tool with a straight concentric shank can be employed with this invention or a tool with a dog-leg or offset shank can be employed as is illustrated.

Returning again to FIGS. 1 and 2, the bowl 14 is provided with a chute 16 which extends outwardly and downwardly from the bowl 14 terminating in a discharge mouth 25 for discharging food which has been processed by the food processor 10 into a suitable exterior container 32. This container 32 is conveniently positioned on a counter or worktable 36 near the food processor 10.

The purpose of this chute 16 and the exterior container 32 is to overcome the limited capacity of the upright bowl structures of the prior art. When such a bowl became filled up, it was necessary to remove the cover and tool and to empty the contents of the bowl before continuing the food processing operation. The limited capacity of the bowl thus prevented uninterrupted food processing operations, where larger quantities of food were desired to be processed, as explained in the introduction.

In accordance with the present invention, the chute 16 directs the processed food into an exterior container 32. If this exterior container happens to become full, it is only necessary to substitute another exterior container, without removing the cover, tool and bowl from the food processor 10. Another alternative which is illustrated in FIG. 3 is to mount the food processor 10 on a table, counter or elevated platform 36 and to discharge the processed food through the chute 16 into a considerably larger exterior container 32A which is resting on a lower level 34, for example on a stool or on the floor, depending upon the height of the large container 32A. In either of these approaches, it is not necessary to disassemble the food processor 10, and the user can process large quantities of food without interruption. In summary, a continuous food processing operation is possible without the limitation posed by the bowl sizes of the prior art devices.

In discharging the food through the chute 16 it is very desirable that the food material which has been processed by the rotary tool 24 be guided and directed out of the chute and not be able to build up or stick at any place along its travel path. In other words, for the convenience of the user the food processor should remain reasonably clean and unclogged and the chute 16 provide a continuous, steady discharge flow 37 of the processed food into the container 32 or 32A.

In order to propel and convey the processed food material effectively and continuously without sticking or accumulating in the chute 16, there is an inclined vibrating deck 40 (FIG. 4) mounted in the bowl 14 below the food processing tool 24 on a plurality of pivoted links 48. (Please see FIG. 5 for their relative spacing and positions). This deck extends on a downward incline towards the discharge mouth 25 of the chute 16. Accordingly, food processed by the rotary food processing tool 24 becomes deposited on the deck 40 and is guided and propelled by the deck down into the chute and along through the chute for discharge out of the mouth 25.

The vibrating inclined deck 40 has a saw tooth upper surface 42 with a clearance opening 44 therethrough to accommodate the rotating tool shank 26. The opening 44 is elongated enough to accommodate free oscillatory movement of the deck 40 back and forth relative to the shank 26. The saw tooth surface 42 includes numerous small ridge lines 43 extending straight across the deck 40 perpendicular to the direction 41 along which the food is propelled. As shown greatly enlarged in FIG. 4A these ridge lines 43 each include an upright steep front facet 45 facing toward the discharge mouth 25 and a rear facet 46 of gradual slope. As will be explained in detail further below, the deck 40 is vibrated back and forth in the direction 53. During each forward stroke of the deck toward the discharge mouth 25 the steep front faces 45 of the ridges 43 push the processed food items forward toward the discharge mouth. During each rearward stroke, the more gradual sloping rear faces 46 slide back beneath the food items. Thus, this saw tooth surface 42 is surprisingly effectively self clearing in propelling food items of whatever kinds cleanly off of itself, when the vibrating deck 40 is allowed to continue vibrating for a brief period after the user has finished processing food by use of the tool 24.

It is noted that the chute 16 includes a fixed top wall 47 (FIG. 4), and the clearance C of the open space at the discharge mouth 25 between the lip 49 of this top wall 47 and the forward end of the vibrating deck 40 is sufficiently small that a person cannot inadvertently insert a hand up the chute 16 sufficiently for the fingers to come into contact with the rotating tool 24. The chute 16 also includes a pair of side walls 59 (FIGS. 5 and 7) which are joined to the fixed top wall 47 and extend downwardly. These side walls 59 are secured to the outside of the bowl 14 as seen in FIGS. 4 and 6, and the wall of the bowl has an opening 61 where the chute is located. The top wall 47 (FIGS. 4 and 6) is secured to the bowl along the top of the opening 61 at a level below the level where the cover 18 is positioned. The bottom of the opening 61 is located slightly below the vibrating deck 40, which forms the bottom surface of the chute 16. Thus, advantageously the top and bottom portions of the bowl 14 above and below the opening 61 at the location of the chute 16 are uninterrupted for receiving a conventional cover 18 and for mounting on a conventional base housing 12. In other words, the continuous output apparatus 10 can be used as a retrofit unit to be mounted on the base housing 12 of an existing food processor and to receive an existing cover 18. The bowl 14 has a skirt 63 (FIGS. 4 and 6) which fits down around a raised circular platform 65 for firmly mounting this apparatus on the machine base housing 12.

In order to prevent processed food items from entering the region between the sidewall of the bowl 14 or the sidewall 59 of the chute 16 and the edge of the deck 40, there is an upstanding rim 50 (FIGS. 4, 6 and 7) extending along the edge of the deck 40. Overlapping this upstanding rim 50 there is a downwardly and inwardly projecting lip 51 on the inside wall of the bowl and chute. The lip 51 provides enough clearance to accomodate the full oscillatory movement of the rim 50 within the confines of the overhanding lip 51.

Vibratory drive means, referred to generally by the reference numeral 55, are provided in order to vibrate the deck 40 back and forth as indicated by the double-headed arrow 53. The vibratory drive means 55 includes a frictional-grip sleeve 52 which is split on its lower end 54 frictionally engaging on and rotating with the lower portion 29 of the shank 26 of the rotary tool 24. This sleeve 52 includes an eccentric upper portion 56 having a driven ring 58 encircling this eccentric 56. There is a connecting rod 60 extending from this ring 58 coupled to a wrist pin 62 of the other end of the connecting rod, which is mounted to the underside of the deck 40 by a bracket 64. The frictional-grip sleeve 52 also includes an annular ledge 57 for supporting and preventing downward slippage of the ring 58.

As seen in FIG. 8, retainer means 66 mounted by screws 68 to the base 69 of the bowl 14 prevent the ring 58 as well as the sleeve 52 from being pulled up during the removal of the tool shank portion 29 from the tool drive mounting means 30. In other words, tools may be changed without removing the vibratory deck 40 or the vibratory drive means 55. In FIG. 8 the multiple axially extending slits 67 forming multiple fingers at the lower end 54 of the frictional-grip sleeve 52 are illustrated. The bore of this lower end 54 tapers inwardly slightly, when the lower tool shank portion 29 is withdrawn as illustrated. Thus, when the tool shank portion is inserted, the fingers defined between the slits 67 become sprung apart slightly for firmly frictionally gripping the tool shank portion 29 for causing the eccentric 56 to rotate with the tool shank.

In operation the rotation of the shank of the rotary tool 24 drives the eccentric 56, thereby oscillating the ring 58 and the rod 60 to drive the wrist pin 62, thereby oscillating or vibrating the deck 40 to and fro as indicated by the arrow 53. In effect depending on the arrangement of the mounting links 48, the deck 40 may be vibrated slightly vertically as well as horizontally. FIG. 4 illustrates the vibrating deck 40 in its highest elevation or full retracted stroke of travel, with the lower end of the deck withdrawn slightly into the discharge mouth 25 of the chute 16. FIG. 6 illustrates just the opposite, showing the lowest elevation of the deck or its furthest forward stroke of travel with the lower end of the deck projecting slightly out of the mouth 25 of the chute 16.

The mounting links 48 each have a pair of pivot pins 70 and 71 as shown in FIGS. 4, 6 and 7 for swingably attaching one end of each link to a bracket 72 fixed to the bowl or chute and for swingably attaching the other end to a bracket 73 fixed to the vibratable deck 40. In FIG. 4 the links 48 are vertical, and in FIG. 6 these links have been swung forwardly and downwardly, thereby producing a forward and downward stroke of deck 40. By virtue of having three such pivoted mounting links 48 as seen in FIG. 5, the deck 40 is permitted to vibrate freely back and forth as driven by the eccentric 56 and the connecting rod 60. Moreover, these three support links stabilize this vibrating deck for maintaining it always at the same inclination (same slope) as it is vibrated back and forth.

As will be seen in FIGS. 4, 6 and 8, an O-ring bearing 74 of slippery plastic material is provided between the frictional-grip sleeve 52 and an upstanding annular wall 75. This upstanding annular wall 75 is located at the center of the base 69 of the bowl 14 and is integral with this base 69 and accommodates the mounting of the bowl 14 around the tool drive means 30. This O-ring bearing 74 is held in a groove in the annular wall 75. The bowl base 69 also is provided with openings 77 therethrough which function as wash holes for convenience of the user when the bowl 14 is removed from the base housing 12 for washing.

FIG. 9 illustrates an alternate embodiment of the friction-grip sleeve 52 for increasing the frictional grip on the lower portion 29 of the tool shank. In addition to the slit lower end 54 of this sleeve there is also a slit upper end 54A having a plurality of slits 67A defining a plurality of fingers which slightly taper inwardly. Thus, when the tool shank is inserted it is gripped by both the lower and upper ends 54 and 54A of the friction-grip sleeve 52.

FIGS. 10 and 11 illustrate another arrangement for driving the sleeve 52 and the eccentric 56 by utilizing splines 76 or keyways on the lower portion 29 of the shank 26 of the rotary tool 24. The sleeve 52 is also correspondingly splined or keyed. The splines or keyways 76 on the shank 26 mating with the correspondingly configured sleeve 52 provide a positive drive for the eccentric 56.

FIG. 12 illustrates another method of driving the eccentric 56. In this embodiment the sleeve 52 is provided with a saddle 80 extending up therefrom which is in contact with the upper portion 33 of the dog-leg shank 26 of the rotary tool 24. This saddle extension 80 has the same slope as the tool shank portion 33, and the inner surface of this saddle has a semicircular cylindrical shape for snuggly receiving the tool shank portion 33 which seats in this saddle for providing a positive drive to the sleeve 52. Thus, the eccentric 56 is positively driven by the tool shank.

FIG. 13 illustrates yet another method of positively driving the eccentric 56. In this embodiment a post 82 secured to the eccentric 56 extends upward from this eccentric and engages against the side of the dog-leg shank portion 33 of the rotary tool. Accordingly, the eccentric is driven by the rotation of the rotary tool 24 to drive the connecting rod 60 and thereby vibrate the deck 40. The retainer means 66 may project inwardly over the ring support flange 57 as shown in FIG. 13 for retaining the eccentric 56 and the sleeve 52 in proper position, when the tool shank portion 29 is withdrawn from the sleeve. For this retainer engagement, the support flange 57 may be increased somewhat in diameter as compared with the size shown in FIG. 8.

With the above-described invention, a food processor can be operated continuously without removing the bowl, the tools or otherwise disassembling the apparatus in order to process a large quantity of food for one meal. The vibratory deck insures the propelling and directing of the processed food out of the bowl through the chute into a larger receptacle. The vibratory stroke motion of the deck effectively and efficiently feeds sliced and processed food items forwardly in the direction 41 out of the chute 16 for providing clean, crisp food cuts or strips or slices or other processed food items 37 in the exterior container 32 or 32A.

The vibratory drive means 55 as shown includes an eccentric 56. It is to be understood that this eccentric can be replaced by a cam or crank or a lobed member for producing an oscillatory or vibrating movement of the follower element 58. This follower element 58 is shown as a ring. It is to be understood that this ring can be replaced by a cam-follower roller mounted on a reciprocatable rod or by a pivoted lever. The purpose of the vibratory drive means 55 is to convert the rotary motion about axis 27 into vibratory motion for vibrating the deck back and forth in the direction 41 as indicated by the double arrow 53. An advantage of the eccentric and ring as shown is the resulting almost sinusoidal acceleration and deceleration of the vibrating deck which is produced. In other words, the acceleration and deceleration of the deck are achieved smoothly without jerk, i.e. without abrupt changes in such acceleration and deceleration.

Since other changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention as defined by the following claims and reasonable equivalents.

What is claimed is:

1. In a food processor of the type including a base housing having an electric motor drive, a bowl mountable on said base housing for enclosing a rotary food processing tool within said bowl, said tool being rotatable within said bowl by said electric motor drive, a removable cover adapted to be secured in position on said bowl, a feed tube forming a passageway for feeding food items into said bowl for processing by the rotating tool, an output vibrating deck apparatus comprising:
    a chute having a discharge end projecting laterally from said bowl for directing food processed by said food processing tool out of said bowl,
    a vibratable inclined deck mounted in said bowl beneath said food processing tool for relative movement between said inclined deck and said bowl, said inclined deck extending on a downward incline toward and within said chute, and
    vibrating drive means coupled to said deck for moving said deck relative to said bowl for causing food processed by said rotary food processing tool deposited on said deck to be guided and propelled by said vibrating deck into and through said chute for discharge from said discharge end of the chute into an external container.

2. In a food processor the output vibrating deck apparatus as claimed in claim 1, in which:
    said vibrating drive means is coupled to said electric motor drive for vibrating said deck by said motor drive which rotates said tool.

3. In a food processor, the output vibrating deck apparatus as claimed in claim 2, in which:
    said electric motor drive includes a motor-driven tool drive shaft extending into said bowl,
    said vibrating drive means includes eccentric means coupled to said motor-driven tool drive shaft for being driven by said drive shaft, and
    said eccentric means being coupled to said vibratable deck for vibrating said deck.

4. In a food processor, the output vibrating deck apparatus as claimed in claim 3 in which:
    said vibrating drive means includes a ring encircling said eccentric means,
    a connecting rod extending from said ring, and
    a pivot pin coupling said connecting rod to said deck for causing oscillatory motion of said ring produced by said eccentric means to move said connecting rod for vibrating said deck.

5. In a food processor, the output vibrating deck apparatus as claimed in claim 1, 2, 3 or 4, in which:
    said vibratable deck includes a multitude of ridge lines extending across said deck perpendicular to a desired direction of movement of the processed through said chute, and
    each of said ridge lines includes a steep front facet facing toward said discharge end of said chute and a gradual sloping rear facet for propelling the processed food toward said discharge end of the chute.

6. In a food processor, the output vibrating deck apparatus, as claimed in claim 1, in which:
    said electric motor drive includes tool drive mounting means extending into the bowl,
    the tool has a tool shank which engages on said tool drive mounting means in positive drive relationship therewith, said vibrating drive means engages said tool shank for being driven by said tool shank, and said vibrating drive means includes means for converting the rotary motion derived from said tool shank into vibrating motion.

7. In a food processor, the output vibrating deck apparatus as claimed in claim 6, in which:

said vibrating drive means includes frictional gripping means for frictionally gripping the tool shank for being driven in rotary motion by the rotating tool shank.

8. In a food processor, the output vibrating deck apparatus as claimed in claim 7, in which:

retaining means are provided for preventing said frictional gripping means from being dislodged when the tool shank is removed from said frictional gripping means.

9. In a food processor, the output vibrating deck apparatus as claimed in claim 6, in which:

said vibrating drive means includes means for engaging said tool shank in positive driving engagement therewith for being driven in rotary motion by said tool shank.

10. In a food processor, the output vibrating deck apparatus as claimed in claim 6, 7, 8 or 9, in which:

said means for converting the rotary motion derived from said tool shank into vibratory motion includes:

a cam rotating around the axis of rotation of the tool shank, a follower member associated with said cam, for being driven with oscillatory motion by said cam, and means coupled from said follower to said deck for vibrating said deck from said oscillatory motion.

11. In a food processor, the output vibrating deck apparatus as claimed in claim 10, in which:

said cam is an eccentric rotating around the axis of rotation of said tool shank, said follower member is a ring encircling said eccentric for being oscillated by said eccentric, and said means coupled from said follower to said deck is a connecting rod extending from said ring, said connecting rod being connected to said deck by a wrist pin.

12. In a food processor, the output vibrating deck apparatus as claimed in claim 1, 2, 3, 4, 6, 7, 8 or 9, in which:

said vibratable deck is mounted in said downward incline in said bowl and chute by means of at least three links each having an upper and a lower end, each of said links has said upper end pivotally connected to said deck by a pivot pin and has said lower end pivotally mounted in a fixed position with respect to said bowl and chute by a pivot pin, and each of said pivot pins has its axis oriented generally perpendicular to the desired direction of movement of processed food downwardly along said vibratable inclined deck.

13. In a food processor, the output vibrating deck apparatus as claimed in claim 12, in which:

said vibrating deck has an extreme retracted position and an extreme forward position, each of said links extends generally vertical when said vibrating deck is in said extreme retracted position and, each of said links leans forward when said vibrating deck is in said extreme forward position for causing said deck to move forward and downward during an advancing stroke.

14. In a food processor, the output vibrating deck apparatus as claimed in claim 1, 2, 3, 4, 6, 7, 8 or 9, in which:

said chute includes a fixed top wall having a lip and fixed side walls, and the clearance space between said lip of said fixed top wall at said discharge end of said chute and said vibrating deck is sufficiently small for preventing a user's hand from being inserted into said chute sufficiently far for a finger to reach the rotating tool in the bowl.

15. Apparatus for continuously feeding processed food from a food processor into an exterior container comprising:

a base housing having an electric motor drive a bowl mountable on said base housing of a food processor for enclosing a rotary food processing tool within said bowl, said tool being rotatable within said bowl by said electric motor drive in said base housing, said bowl being adapted to have a removable cover secured in position on said bowl with a feed tube forming a passageway for feeding food items into said bowl for processing by said rotating tool, said bowl having a side wall with an opening therein, a chute projecting laterally from said opening for directing food processed by said tool out of said bowl, said chute including a fixed wall secured to the bowl near the top of said opening and a pair of fixed side walls joined to said top wall and extending downwardly from said top wall, said side walls being secured to said bowl, said chute having a discharge end, a vibratable inclined deck mounted in said bowl beneath said food processing tool for relative movement between said inclined deck and said bowl, said inclined deck extending on a downward incline toward and within said chute, and vibrating drive means coupled to said deck for moving said deck relative to said bowl for causing food processed by said rotary food processing tool deposited on said deck to be guided and propelled by said vibrating deck in a desired direction of movement into and through said chute to said discharge end for discharge into an external container.

16. Apparatus for continuously feeding processed food from a food processor into an exterior container as claimed in claim 15, in which:

said vibrating drive means is coupled to said electric motor drive for vibrating said deck by said motor drive which rotates said tool.

17. Apparatus for continuously feeding processed food from a food processor into an exterior container as claimed in claim 16, in which:

said electric motor drive includes a motor-driven tool drive shaft extending into said bowl, said vibrating drive means includes eccentric means coupled to said motor-driven tool drive shaft for being driven by said drive shaft, and said eccentric means being coupled to said vibratable deck for vibrating said deck.

18. Apparatus for continuously feeding processed food from a food processor into an exterior container as claimed in claim 17, in which:
said vibrating drive means includes a ring encircling said eccentric means,
a connecting rod extending from said ring, and
a pivot pin coupling said connecting rod to said deck for causing oscillatory motion of the ring produced by said eccentric means to move said connecting rod for vibrating the deck.

19. Apparatus for continuously feeding processed food from a food processor into an exterior container as claimed in claim 15, 16, 17 or 18, in which:
said vibratable deck includes a multitude of ridge lines extending across said deck perpendicular to said desired direction of movement of the processed food, and
each of said ridge lines includes a steep front facet facing toward said discharge end of said chute and a gradual sloping rear facet for propelling the processed food toward the discharge end of the chute.

20. Apparatus for continuously feeding processed food from a food processor into an exterior container as claimed in claim 15, in which:
said electric motor drive includes a tool drive mounting means extending into the bowl when the bowl is mounted on said base housing,
the rotary tool has a tool which engages on said tool drive mounting means in positive drive relationship for rotating therewith,
said vibrating drive means engages said tool shank for being driven by the rotating tool shank, and
said vibrating drive means includes means for converting the rotary motion derived from the tool shank into vibrating motion.

21. Apparatus for continuously feeding processed food from a food processor into an exterior container as claimed in claim 20, in which:
said vibrating drive means includes frictional gripping means for frictionally gripping the tool shank for being driven in rotary motion by the rotating tool shank.

22. Apparatus for continuously feeding processed food from a food processor into an exterior container as claimed in claim 21, in which:
retaining means are provided for preventing said frictional gripping means from being dislodged when the tool shank is removed from said frictional gripping means.

23. Apparatus for continuously feeding processed food from a food processor into an exterior container as claimed in claim 15, in which:
said vibrating drive means includes means for engaging the tool shank in positive driving engagement therewith for being driven in rotary motion by the rotating tool shank.

24. Apparatus for continuously feeding processed food from a food processor into an exterior container as claimed in claim 20, 21, 22 or 23, in which:
said means for converting the rotary motion derived from said tool shank into vibratory motion includes:
a cam rotating around the axis of rotation of the tool shank,
a follower member associated with said cam, for being driven with oscillatory motion by said cam, and
means coupled from said follower to said deck for vibrating said deck from said oscillatory motion.

25. Apparatus for continuously feeding processed food from a food processor into an exterior container as claimed in claim 24, in which:
said cam is an eccentric rotating around the axis of rotation of the tool shank,
said follower member is a ring encircling said eccentric for being oscillated by said eccentric, and
said means coupled from said follower to said deck is a connecting rod extending from said ring, said connecting rod being connected to said deck by a wrist pin.

26. Apparatus for continuously feeding processed food from a food processor into an exterior container as claimed in claim 15, 16, 17, 18, 20, 22 or 23, in which:
said chute includes a fixed top wall having a lip and fixed side walls, and
the clearance space between said lip of said fixed top wall at said discharge end of said chute and said vibrating deck is sufficiently small for preventing a user's hand from being inserted into said chute sufficiently far for a finger to reach the rotating tool in the bowl.

27. Apparatus for continuously feeding processed food from a food processor into an exterior container as claimed in claim 15, 16, 17, 18, 20, 21, 22 or 23 in which:
said vibratable deck is mounted in said downward incline in said bowl and chute by means of at least three links each having an upper end and a lower end,
each of said links has said upper end pivotally connected to said deck by a pivot pin and has said lower end pivotally mounted in a fixed position with respect to said bowl by a pivot pin, and
each of said pivot pins has its axis oriented generally perpendicular to the desired direction of movement of processed food downwardly along said vibratable inclined deck.

28. Apparatus for continuously feeding processed food from a food processor into an exterior container as claimed in claim 27, in which:
said vibratable deck has an extreme retracted position and an extreme forward position,
each of said links extends generally vertical when said vibrating deck is in its said extreme retracted position and,
each of said links leans forward when said vibrating deck is in its said extreme forward position for causing said deck to move forward and downward during an advancing stroke.

* * * * *